US011509137B2

(12) United States Patent
Zimmanck (10) Patent No.: US 11,509,137 B2
(45) Date of Patent: Nov. 22, 2022

(54) VOLTAGE AND CURRENT MANAGEMENT IN THREE-PHASE INTERCONNECTED POWER SYSTEMS USING POSITIVE AND NEGATIVE SEQUENCE SECONDARY CONTROL

(71) Applicant: Enphase Energy, Inc., Petaluma, CA (US)

(72) Inventor: Donald Richard Zimmanck, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 160 days.

(21) Appl. No.: 17/083,223

(22) Filed: Oct. 28, 2020

(65) Prior Publication Data

US 2021/0184463 A1    Jun. 17, 2021

Related U.S. Application Data

(60) Provisional application No. 62/927,057, filed on Oct. 28, 2019.

(51) Int. Cl.
| | |
|---|---|
| *H02J 3/06* | (2006.01) |
| *H02J 3/18* | (2006.01) |
| *G05B 15/02* | (2006.01) |
| *H02J 3/32* | (2006.01) |
| *H02J 3/46* | (2006.01) |

(52) U.S. Cl.
CPC ............... *H02J 3/18* (2013.01); *G05B 15/02* (2013.01); *H02J 3/06* (2013.01); *H02J 3/32* (2013.01); *H02J 3/46* (2013.01)

(58) Field of Classification Search
CPC ........ H02J 3/06; H02J 3/18; H02J 3/32; H02J 3/46; G05B 15/02
See application file for complete search history.

(56) References Cited

U.S. PATENT DOCUMENTS

| | | | |
|---|---|---|---|
| 5,352,872 | A | 10/1994 | Hayashi et al. |
| 6,573,691 | B2 | 6/2003 | Ma et al. |
| (Continued) | | | |

FOREIGN PATENT DOCUMENTS

| | | |
|---|---|---|
| CN | 101039031 A | 9/2007 |
| CN | 101944743 A | 1/2011 |
| (Continued) | | |

OTHER PUBLICATIONS

Marija et al., "Improved Secondary and New Tertiary Voltage Control ", IEEE Transactions on Power Systems, vol. 10, No. 4, Nov. 1995, pp. 1851-1862.

(Continued)

*Primary Examiner* — Harry R Behm
(74) *Attorney, Agent, or Firm* — Moser Taboada (57) ABSTRACT

A method and apparatus for secondary control in a power network. In one embodiment, the method comprises determining a frequency area controller error (ACE) equation for an area and a voltage ACE for the area; decomposing the frequency ACE equation and the voltage ACE equation to generate a first set of symmetric sequences for the frequency ACE equation and a second set of symmetric sequences for the voltage ACE equation, respectively, wherein the first and second sets of symmetric sequences represent positive and negative sequences; and implementing, by an area controller for the area, secondary control on each sequence in the first and second sets of symmetric sequences separately.

17 Claims, 3 Drawing Sheets

(56) References Cited

U.S. PATENT DOCUMENTS

| | | |
|---|---|---|
| 8,797,003 B2 | 8/2014 | Hata et al. |
| 8,964,432 B2 | 2/2015 | Czarkowski et al. |
| 9,507,367 B2 | 11/2016 | Harley et al. |
| 9,742,411 B1 | 8/2017 | Fan et al. |
| 2014/0365025 A1 | 12/2014 | Forbes |

FOREIGN PATENT DOCUMENTS

| | | | |
|---|---|---|---|
| CN | 102664417 A | | 9/2012 |
| CN | 102110982 B | | 12/2012 |
| CN | 202930941 U | * | 5/2013 |
| CN | 105162134 A | * | 12/2015 |
| CN | 105356475 A | | 2/2016 |
| CN | 107294116 A | | 10/2017 |
| EP | 3024110 A2 | | 5/2016 |
| RU | 94077 U1 | * | 5/2010 |

OTHER PUBLICATIONS

Chunyu Chen et al., "Tie-Line Bias Control Applicability to Load Frequency Control for Multi-Area Interconnected Power Systems of Complex Topology". Energies MDPI, Jan. 11, 2017, pp. 1-14.

International Search Report and written Opinion for International application No. PCT/US2020/057792, dated Feb. 24, 2021.

H. Vu et al., "An improved voltage control on large-scale power system", IEEE Transactions on Power Systems (vol. 11, Issue: 3, Aug. 1996), pp. abstract, DOI: 10.1109/59.535670.

Zhenyu Fan, "Voltage and frequency control of distribution system in the presence of distributed generation", dated May 2004, Clemson University ProQuest Dissertations publishing, p. 8, second paragraph.

Mehdi et al., "Secondary Control for Voltage Quality Enhancement in Microgrids", IEEE Transactions on Smart Grid (vol. 3, Issue: 4, Dec. 2012), pp. abstract, DOI: 10.1109/TSG.2012.2205281.

Lee et al., "D-STATCOM With Positive-Sequence Admittance and Negative-Sequence Conductance to Mitigate Voltage Fluctuations in High-Level Penetration of Distributed-Generation Systems", IEEE Transactions on Industrial Electronics (vol. 60, Issue: 4, Apr. 2013), pp. abstract, DOI: 10.1109/TIE.2011.2166233.

E. Smith et al. "Secondary control of voltage & current unbalance in a multi-bus microgrid using cooperative adjustment of Q- droop gains", 2017 Australasian Universities Power Engineering Conference (AUPEC), DOI: 10.1109/AUPEC.2017.8282388, p. 1, abstract http://ro.uow.edu.au/cgl/viewcontent.col?reference=https://www.google.com/&httpsredir=1&article=2184&context=papers1.

* cited by examiner

VOLTAGE AND CURRENT MANAGEMENT IN THREE-PHASE INTERCONNECTED POWER SYSTEMS USING POSITIVE AND NEGATIVE SEQUENCE SECONDARY CONTROL

CROSS-REFERENCE TO RELATED APPLICATIONS

This application claims benefit of U.S. provisional patent application Ser. No. 62/927,057, entitled "Voltage and Current Management in Three-Phase Interconnected Power Systems Positive and Negative Sequence Secondary Control" and filed Oct. 28, 2019, which is herein incorporated in its entirety by reference.

BACKGROUND OF THE INVENTION

Field of the Invention

Embodiments of the present disclosure relate generally to secondary control for power systems, and, more particularly, to using secondary control to regulate grid voltage.

Description of the Related Art

Today's AC power systems are controlled using a technique known as "tie-line bias control" where electric power grids are sub-divided into control areas and the transmission lines that connect an area to its neighboring areas are called "tie-lines".

An area coordinator measures the frequency of the system along with the net import/export of power from the control area and calculates an "Area Control Error", or ACE, which is a function of the frequency error and the net power import/export error relative to some dispatched target:

$$ACE = \Delta P + K \Delta F \quad (1)$$

Where ACE is the area control error in W, $\Delta P$ is the power control error (i.e., the difference between the requested area net intertie and the measured), $\Delta F$ is the frequency error, and K is the "K-factor" for the control area. The "K-factor" is typically set to the prevailing frequency response of the control area to isolate ACE regulations to reject load/generation changes that occur outside of the control area, and only respond to load/generation changes within the area.

The area controller is responsible for commanding resources within the area to increase or decrease their power in order to keep the ACE as close to zero as possible through a process known as "secondary control" where the area controller broadcasts secondary control commands (also known as automatic generation control, or AGC) to all entities participating in the system. Distributed frequency regulation is accomplished through this process assuming the sum of all net interties targets across the system sums to zero; i.e., the power flow between different areas is regulated in order to hold the grid frequency constant.

As more resources are installed at the distribution level, it is possible for resources to use variations of the tie-line bias control technique to regulate aspects of the power system other than frequency, such as voltage regulation. By operating secondary controllers to regulate both ACEs to 0, the system can regulate both voltage and frequency in a distributed manner. However, many of these resources may be installed deep into distribution systems and only connect to a single phase on a three-phase network. While overall voltage may be maintained, the mismatch in resources on each phase may lead to significant phase-to-phase imbalance, causing voltage quality issues on single-phase services as well as potentially lower power factor on system transformers. Therefore, there is a need in the art for a secondary control technique to provide both voltage regulation and phase balancing on three-phase power systems.

SUMMARY OF THE INVENTION

Embodiments of the present invention generally relate to secondary control for power systems as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for using secondary control to regulate grid voltage. In one or more embodiments, secondary control is utilized to maintain balanced three-phase voltage quality on interconnected power systems containing a mix of single-phase and three-phase control areas. The techniques described herein may be used for distributed frequency, voltage regulation and phase balancing on three-phase power systems with mixed three-phase and single-phase resources to provide more efficient phase balancing (i.e. faster response times) and better power quality in microgrids as well as better penetration of single-phase resources.

Figure 1:
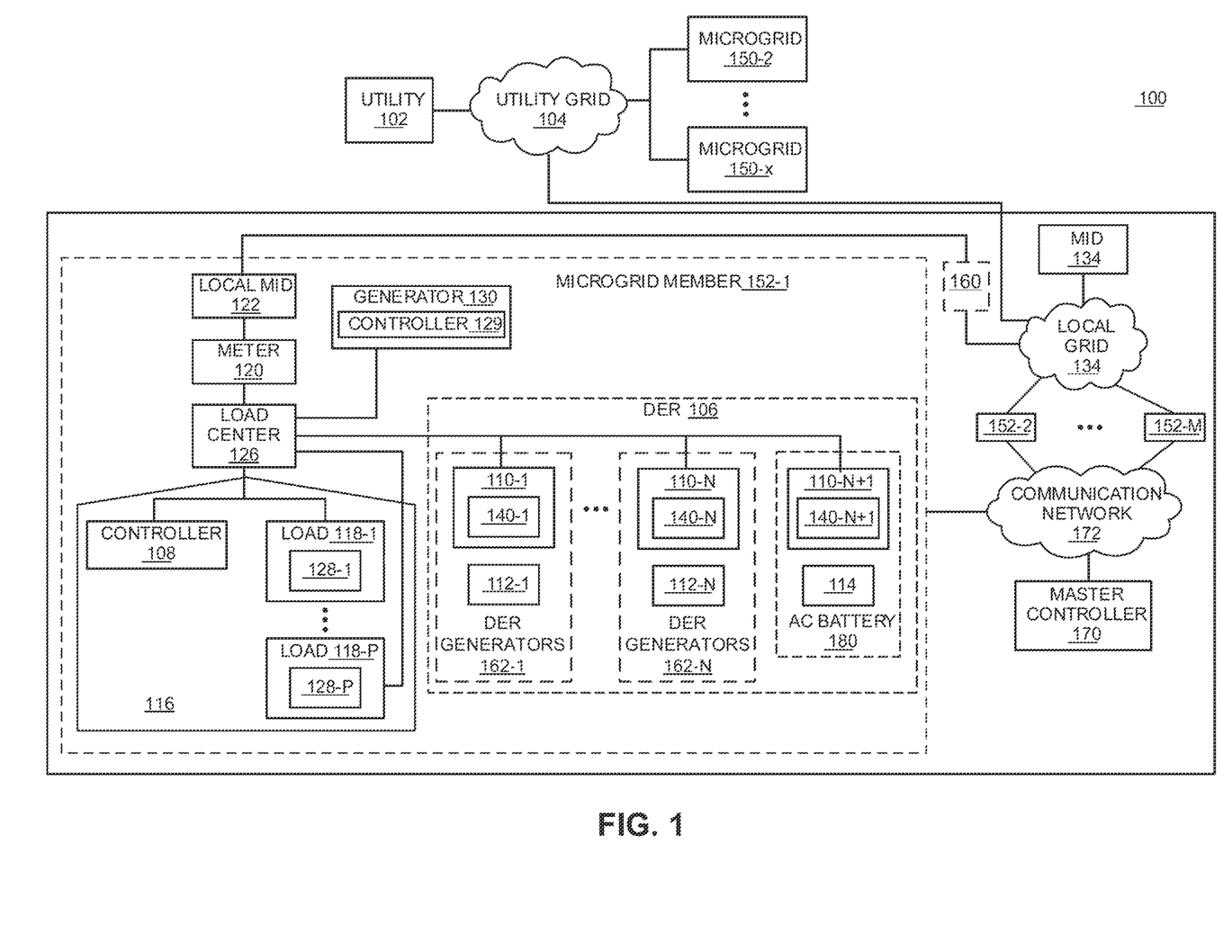
FIG. 1 is a block diagram of a power system in accordance with one or more embodiments of the present invention.

FIG. 1 is a block diagram of a power system 100 in accordance with one or more embodiments of the present invention. The power system 100 comprises a hierarchy of areas connected together by interties. This diagram only portrays one variation of the myriad of possible system configurations. The present invention can function in a variety of environments and systems.

The power system 100 comprises a utility 102 (such as a conventional commercial utility) and a plurality of microgrids 150-1, 150-2, . . . , 150-X (collectively referred to as microgrids 150) coupled to the utility 102 via a utility grid 104 (e.g., a three-phase utility grid). Through their connections to the utility grid 104, each microgrid 150 as a whole may receive energy from the utility grid 104 or may place energy onto the utility grid 104. In some embodiments, coupling energy to a commercial utility grid is strictly controlled by regulation and the microgrids 150 maintain or strive to maintain a zero-energy output policy.

Each microgrid 150 is capable of operating without energy supplied from the utility 102 and may cover a neighborhood, a village, a small city, or the like, as the term "microgrid" is not intended to imply a particular system size.

Although the microgrid 150-1 is depicted in detail in FIG. 1 and described herein, the microgrids 150-2 through 150-X are analogous to the microgrid 150-1. However, the number and/or type of various microgrid components may vary among the microgrids 150.

The microgrid 150-1 comprises a plurality of microgrid members 152-1, 152-2, . . . , 152-M (collectively referred to as microgrid members 152), each of which is a microgrid that can operate when isolated from the rest of the microgrid 150. The microgrid members 152 are coupled to a local grid 132 which in turn is coupled to the utility grid 104 via a microgrid interconnect device (MID) 134 (which may also be referred to as an island interconnect device, or IID). The local grid 132 may be a trunk of the utility grid 104 or it may be a specifically designed local grid for the microgrid 150-1. In some embodiments the local grid 132 may be a three-phase grid, although in other embodiments it may be a single-phase grid. In one or more embodiments where the local grid 132 is a three-phase grid, the microgrid member 152-1 may comprise a mix of three-phase resources and single-phase resources (e.g., a mix of three-phase power conditioners 110 and single-phase power conditioners 110).

The MID 134 generally comprises a controller having a processor (not shown) and determines when to disconnect/connect the microgrid 150-1 from/to the utility grid 104 and performs the disconnection/connection (although in some embodiments the MID 134 may receive instructions from another component or system for disconnecting from/connecting to the utility grid 104). When connected to the utility grid 104, the microgrid 150-1 operates in a grid-connected (GC) mode; when disconnected from the utility grid 104, the microgrid 150-1 operates in an islanded (IS) mode. For example, the MID 134 may detect a fluctuation, disturbance or outage with respect to the utility grid 104 and, as a result, disconnect the microgrid 150-1 from the utility grid 104. The MID 134 may also disconnect the microgrid 150-1 from the utility grid 104 when the microgrid 150-1 is either overproducing energy or overloading the utility grid 104. Once disconnected from the utility grid 104, the microgrid 150-1 can continue to generate power as an intentional island without imposing safety risks on any line workers that may be working on the utility grid 104. The MID 134 may additionally comprise a transceiver (not shown) for communicating with one or more of the microgrid components. In certain embodiments the MID 134 may send command and control signals to one or more microgrid member components (e.g., the controller 108, the power conditioners 110, the generator 130, and the loads 118), such as secondary control instructions (e.g., active and reactive current commands to resource controllers), which may be generated by the MID 134 or received from another device.

The microgrid member 152-1 comprises a building 116 (e.g., a residence, commercial building, or the like) coupled to a load center 126 which may be within or outside of the building 116. The load center 126 is coupled to the local grid 132 via a utility meter 120 and a local MID 122, a distributed energy resource (DER) 106, a generator 130, and a plurality of loads 118-1 . . . 118-P (collectively referred to as loads 118) for coupling power among these components. Although the microgrid member 152-1 is depicted in detail in FIG. 1 and described herein, the microgrid members 152-2 through 152-M are analogous to the microgrid member 152-1. However, the number and/or types of various microgrid member components may vary among the microgrid members 152.

The local MID 122 generally comprises a controller having a processor (not shown) and determines when to disconnect/connect the microgrid member 152-1 from/to the local grid 132 and performs the disconnection/connection (although in some embodiments the local MID 122 may receive instructions from another component or system for disconnecting from/connecting to the local grid 132). For example, the local MID 122 may detect a grid fluctuation, disturbance or outage and, as a result, disconnect the microgrid member 152-1 from the local grid 132. The MID 122 may also disconnect the microgrid member 152-1 from the local grid 132 when the microgrid member 152-1 is either overproducing energy or overloading the local grid 132. When connected to the local grid 132, the microgrid member 152-1 operates in a grid-connected (GC) mode; when disconnected from the local grid 132, the microgrid member 152-1 operates in an islanded (IS) mode. Once disconnected from the local grid 132, the microgrid member 152-1 can continue to generate power as an intentional island without imposing safety risks on any line workers that may be working on the local grid 132. The local MID 122 may comprise a transceiver (not shown) for communicating with one or more of the microgrid member components. In certain embodiments the MID 122 may send command and control signals to one or more of the controller 108, the power conditioners 110, the generator 130, and the loads 118 (e.g., secondary control instructions, such as active and reactive current commands to resource controllers, which may be generated by the MID 122 or received from another device).

The meter 120 measures the ingress and egress of energy for the microgrid member 152-1; in some embodiments, the meter 120 comprises the MID 122 or a portion thereof. The meter 120 generally measures active power flow (kWh), reactive power flow (kVAR), grid frequency, and grid voltage (referred to herein as the measured parameters). In certain embodiments these measured parameters may be communicated to a microgrid monitoring system (not shown) that monitors each of the microgrid members 152.

The DER 106 comprises power conditioners 110-1 . . . 110-N, 110-N+1 coupled in parallel to a bus 124 that is further coupled to the load center 126. Generally, the power conditioners 110 are bi-directional inverters and a first subset of the power conditioners 110 generate power from DC energy sources (e.g., renewable energy sources such as wind, solar, hydro, and the like) while a second subset of the power conditioners 110 generate power from/couple energy to energy storage/delivery devices (e.g., batteries or the like). The combination of a DC energy source and a corresponding power conditioner 110 may be referred to herein as a DER generator (e.g., DER generators 162-1-162-N). In those embodiments where the power conditioners 110 are DC-AC inverters, a power conditioner 110 coupled to an energy storage/delivery device may together be referred to as an AC battery; in those embodiments where the power conditioners 110 are DC-DC converters, a power conditioner 110 coupled to an energy storage/delivery device may together be referred to as a battery DC supply.

In one or more embodiments, such as the embodiment depicted in FIG. 1, the power conditioners 110-1 . . . 110-N are respectively coupled to DC energy sources 112-1 . . . 112-N (e.g., renewable energy sources such as wind, solar, hydro, and the like) for receiving DC power and generating commercial grid-compliant AC power that is coupled to the bus 124. In some of these embodiments, each DC source 112 is a photovoltaic (PV) module. In some alternative embodiments, multiple DC sources 112 are coupled to a single power conditioner 110 (e.g., a single, centralized power conditioner).

As further depicted in FIG. 1, the power conditioner 110-N+1 is coupled to an energy storage/delivery device 114 to form an AC battery 180. The power conditioner 110 of the AC battery 180 can convert AC power from the bus 124 to energy that is stored in the energy storage/delivery device 114, and can further convert energy from the energy storage/delivery device 114 to commercial grid-compliant AC power that is coupled to the bus 124. The energy storage/delivery device 114 may be any energy storage device having a "charge level", such as a battery, flywheel, compressed air storage, or the like. Although only a single AC battery 180 is depicted in FIG. 1, other embodiments may comprise more AC batteries 180 or even no AC batteries 180.

Each of the power conditioners 110 comprises a power conditioner controller 140 for controlling the corresponding power conditioner 110, which may include primary control techniques such as implementing droop control techniques that allow the power conditioners 110 to share the load in a safe and stable manner when the microgrid member 152-1 is disconnected from the utility 102 or the local grid 132 (or, alternatively, when operating in a grid-connected mode).

A controller 108 is coupled to the bus 124 via the load center 126 and communicates with the power conditioners 110, the generator 130, and the loads 118 (e.g., via power line communications (PLC) and/or other types of wired and/or wireless techniques). The controller 108 may send command and control signals to one or more of the power conditioners 110, the generator 130, and the loads 118 (e.g., secondary control instructions, such as active and reactive current commands to resource controllers, which may be generated by the controller 108 or received from another device) and/or receive data (e.g., status information, performance data, and the like) from one or more of the power conditioners 110, the generator 130, and the loads 118. In some embodiments, the controller 108 may be a gateway that is further coupled, by wireless and/or wired techniques, to a master controller 170 via a communication network 172 (e.g., the Internet) for communicating data to/receiving data from the master controller 170 (e.g., performance information, alarms, messages, control instructions, and the like). In some embodiments the master controller 170 may send command and control signals to one or more of the controller 108, the power conditioners 110, the generator 130, and the loads 118 (e.g., secondary control instructions, such as active and reactive current commands to resource controllers, which may be generated by the master controller 170 or received from another device).

In certain embodiments, the controller 108 comprises the local MID 122 or a portion of the local MID 122 (e.g., an islanding module for monitoring grid health, detecting grid failures and disturbances, determining when to disconnect from/connect to the local grid 132, and driving a disconnect component accordingly, where the disconnect component may be part of the controller 108 or, alternatively, separate from the DER controller 108). In some embodiments, the controller 108 may coordinate with the local MID 122, e.g., using PLC.

Although the microgrid member 152-1 is depicted in FIG. 1 as having a single DER 106, in other embodiments the microgrid member 152-1 may have additional DERs, each of which may be different types of DERs (e.g., solar, wind, and the like). In some alternative embodiments, the DER controller 108 and the DER generators 162 are absent from the microgrid member 152-1 and the DER 106 comprises only one or more AC batteries 180.

The generator 130 is an energy generator, such as a diesel generator, that automatically increases or curtails energy output depending on the needs of the microgrid member 152-1. The generator 130 comprises a generator controller 129. The generator controller 129 may optimize the operation of the generator 130 with respect to the microgrid member 152-1 and/or the microgrid 150-1 (e.g., by generating control instructions for the generator 130); implement control instructions for operating the generator 130 (e.g., instructions received from another component, such as the controller 108, or from another system); obtain data pertaining to the generator 130 (e.g., performance data, operational data, or the like) which may further be communicated to another component or system; or perform similar functions. The generator controller 129 may implement droop control techniques to control operation of the generator 130 when the microgrid member 152-1 is operating in an islanded mode, although in some alternative embodiments the generator 130 may also be controlled using droop control when operating in a grid-connected mode.

In one or more embodiments, the power conditioners 110 and the generator 130 are droop-controlled such that when the microgrid member 152-1 is disconnected from the local grid 132 or the utility grid 104 (e.g., using the MID 122 and/or the MID 134) and operating in an autonomous mode, the power conditioners 110 and the generator 130 employ the same droop control technique for parallel operation without the need for any common control circuitry or communication among the components.

The loads 118 are non-critical loads (e.g., hot water heaters, refrigerators, HVAC equipment, pumps, electric cars, room lighting, and the like) that consume energy from the transmission line electrically interconnecting the microgrid components (which may be referred to as the microgrid member grid, the microgrid grid, or simply the grid) obtained via the load center 126. Although the loads 118 are depicted in FIG. 1 as within the building 116, one or more of the loads 118 may be located outside of the building 116. The loads 118 may be static loads, dynamic loads, or some combination thereof (i.e., some of the loads 118 are static loads while others are dynamic loads).

The loads 118 are intelligent loads (which may also be referred to as "smart loads") that each comprise a load controller 128, for controlling operation of the corresponding load 118 (e.g., for implementing preset control instructions and/or control instructions received, for example via PLC, from another component, such as the controller 108), obtaining data pertaining to the corresponding load 118 (e.g., performance data, operational data, and the like) which may further be communicated to another component or system; and/or performing similar functions.

Each of the controllers 108, 128, 129, 140, and 170 may be comprised of hardware, software, or a combination thereof, and may in certain embodiments comprise a central processing unit (CPU) coupled to each of support circuits and a memory. Each of the controllers 108, 128, 129, 140, and 170 may be implemented using a general-purpose computer that, when executing particular software, becomes a specific purpose computer for performing various embodiments of the present invention. In those embodiments where a controller includes a CPU, the CPU may comprise one or more conventionally available microprocessors, microcontrollers and the like, which are capable of performing the processing described herein; e.g., the CPU may be a microcontroller comprising internal memory for storing controller firmware that, when executed, provides the functionality described herein. In certain embodiments, the CPU may include one or more application specific integrated circuits (ASICs). The support circuits coupled to the CPU are well known circuits used to promote functionality of the CPU (e.g., a cache, power supplies, clock circuits, buses, network cards, input/output (I/O) circuits, and the like). The memory coupled to the CPU may comprise random access memory, read only memory, removable disk memory, flash memory, and various combinations of these types of memory. The memory is sometimes referred to as main memory and may, in part, be used as cache memory or buffer memory. The memory generally stores the operating system (OS) of the controller, which may be one of a number of commercially available OSs such as, but not limited to, Linux, Real-Time Operating System (RTOS), and the like. The memory generally stores various forms of application software that, when executed, performs one or more functions described herein.

In accordance with one or more embodiments of the present invention, power network resources (e.g., the generator 130, power conditioners 110, loads 118, the DER 106, and the like) and resource controllers (e.g., load controllers 128, generator controller 129, power conditioners 140, as well as controller 108, master controller 170, MIDs 122 and 134, and the like) may utilize the modified tie-line bias control technique described herein to provide both voltage regulation and phase balancing on three-phase power systems. In some embodiments such voltage regulation is done by calculating two area control errors, one for voltage and one for frequency:

$$ACE_f = \Delta F + G_{00}*\Delta W + G_{01}*\Delta VAR \quad (2)$$

$$ACE_v = \Delta V + G_{10}*\Delta W + G_{11}*\Delta VAR \quad (3)$$

Where the G matrix represents the interactions between V, F, W (or Ia), and VAR (or Ir):

TABLE 1

| Variable Name | Units | Description |
|---|---|---|
| $G_{00}$ | Hz/W | Frequency response of system to W |
| $G_{01}$ | Hz/VAR | Frequency response of system to VAR |
| $G_{10}$ | V/W | Voltage response of system to W |
| $G_{11}$ | V/VAR | Voltage response of system to VAR |

In some other embodiments Ia/Ir may be used instead of W/Var.

In various embodiments, the complete interconnected power system, such as the system 100 described above, contains a mix of single-phase and three-phase control areas; this mix of single-phase and three-phase control areas may be within a microgrid member 152 (for example, some of the loads 118, generator 130, and power conditioners 140 may be single-phase devices, while others may be three-phase devices), within a microgrid 150, or among various microgrids 150.

The techniques described herein utilize the concept of "sequence decomposition" where an unbalanced set of N phasors can be represented with a balanced set of N phasors. When this transformation, which may also be referred to as a Fortescue decomposition, is applied to three-phase systems, the resulting phasors are known as "positive sequence", "negative sequence" and the "zero sequence". In accordance with one or more embodiments of the present invention, secondary control is implemented on the symmetric sequences separately and thereby provides a distributed technique for phase balancing.

$$ACE_f^+ = (f - f_0 + f_{sec}^+) + G_{00}(I_a^+ - I_{asch}^+) + G_{01}(I_r^+ - I_{rsch}^+) \quad (4)$$

$$ACE_v^+ = (v^+ + v_0^+ + v_{sec}^+) + G_{10}(I_a^+ - I_{asch}^+) + G_{11}(I_r^+ - I_{rsch}^+) \quad (5)$$

$$ACE_f^- = (f - f_0 + f_{sec}^-) + G_{00}(I_a^- - I_{asch}^-) + G_{01}(I_r^- - I_{rsch}^-) \quad (6)$$

$$ACE_v^- = (v^- + v_0^- + v_{sec}^-) + G_{10}(I_a^- - I_{asch}^+) + G_{11}(I_r^- - I_{rsch}^-) \quad (7)$$

The equations (4)-(7) calculate the intertie errors in active and reactive currents rather than real and reactive powers due to the fact that powers are not phasors whereas currents are, and this is a phasor technique. In some embodiments, all secondary control may be implemented with currents rather than W and VAR, as in the previous equations W and VAR are just the active and reactive currents scaled by the system voltage.

It should be noted that only the equations for the positive and negative sequences are shown for brevity. This is all that is needed in three-wire delta systems as the zero sequence is always 0. In 4-wire systems with a neutral, a 0-sequence controller could be applied to attempt to zero out the net neutral current at an intertie.

Notice that frequency does not have a Fortescue decomposition as it is the same among all three phases, but the frequency ACE does as frequency bias affects active and reactive currents as well.

It is also worth noting that in certain embodiments the G terms may be different on the positive sequence components than the negative sequence components. One such embodiment is when there are different numbers of single-phase inverters on each phase. In such embodiment, the coefficients in the transformation matrix G may be different between for positive and negative sequences.

The technique described above provides a universal approach for implementing secondary controls across an entire power network, such as the system 100. It also provides an interface for requesting negative sequence net interties from an area to assist with global phase balancing. The resulting secondary control biases broadcast by an area controller can easily be interpreted by both three-phase and single-phase inverters within the area. Three-phase inverters simply put the biases through a reverse Fortescue transformation and apply different biases to each phase-leg. A single-phase inverter does the same thing and simply uses the bias term of the phase leg it happens to be attached to.

Figure 2:
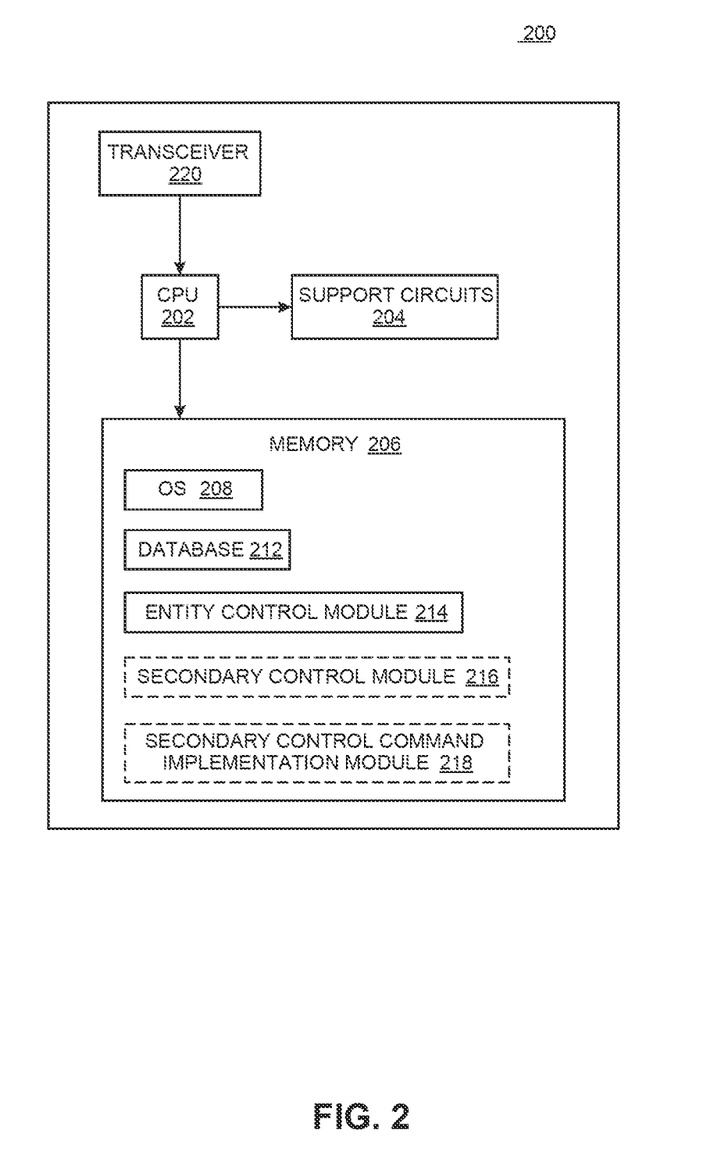
FIG. 2 is a block diagram of a controller in accordance with one or more embodiments of the present invention.

FIG. 2 is a block diagram of a controller 200 in accordance with one or more embodiments of the present invention. The controller 200 is analogous to the various controllers described above with respect to FIG. 1.

In one or more embodiments, the controller 200 is an area controller that implements secondary control with respect to its area and is responsible for regulating its ACE. The area controller controls its allocated resources but does not need to be physically located within the area it controls; in one or more embodiments, the area controller is able to control a physical disconnection from upstream equipment. The area controller comprises a secondary control module (described below) and in various embodiments also comprises a primary control module for implementing primary control and/or a tertiary control module for implementing tertiary control. Any of the controllers described above with respect to FIG. 1 may be area controllers, with each area controller managing its downstream resources within a hierarchy of area controllers in the system 100. For example, the controller 108 may be an area controller that manages the resources of microgrid member 152-1, with each of the microgrid members 152-2 through 152-M in the microgrid 150-1 having similar area controllers, and the master controller 170 is an area controller than manages the resources of the microgrid 150-1. In other embodiments, one or more additional controllers not shown in FIG. 1 may be present and act as area controllers for various areas of the system 100; for example, another controller may be present and act as the area controller for the microgrid member 152-1 (e.g., a controller 160 (shown in phantom) coupled between the local MID 122 and the local grid 134). An area controller may communicate with its resources via any suitable communication technique, such as wired (e.g., power line communication) and/or wireless.

The controller 200 comprises support circuits 204, one or more transceivers 220, and a memory 206, each coupled to a central processing unit (CPU) 202. The one or more transceivers 220 communicate with other devices in the system 100 by any suitable wired and/or wireless communications technique (e.g., power line communication). The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The controller 200 may be implemented using a general purpose computer that, when executing particular software, becomes a specific purpose computer for performing various embodiments of the present invention. In other embodiments, the CPU 202 may be a microcontroller comprising internal memory for storing controller firmware that, when executed, provides the controller functionality described herein. The controller 200 may be composed of hardware, firmware, local software, or cloud software, or any combination thereof.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores an operating system (OS) 208, if necessary, that can be supported by the CPU capabilities. In some embodiments, the OS 208 may be one of a number of commercially available operating systems such as, but not limited to, LINUX, Real-Time Operating System (RTOS), and the like. The memory 206 further stores non-transient processor-executable instructions and/or data that may be executed by and/or used by the CPU 202. These processor-executable instructions may comprise firmware, software, and the like, or some combination thereof. The memory 206 may additionally store a database 212 for storing data, such as data related to the present invention.

The memory 206 stores various forms of application software, such as an entity control module 214 for controlling one or more entities associated with the controller 200. For example, when the control module 200 is a power conditioner controller 140, the entity control module 214 controls power conversion in the corresponding power conditioner 110.

In those embodiments where the controller 200 is an area controller, the memory 206 further comprises a secondary control module 216 for implementing secondary control functions as described herein. In those embodiments where the controller 200 controls a resource that receives and implements secondary control commands, the memory 206 further comprises a secondary control command implementation module 218 which implements the received secondary control commands as described herein.

Figure 3:
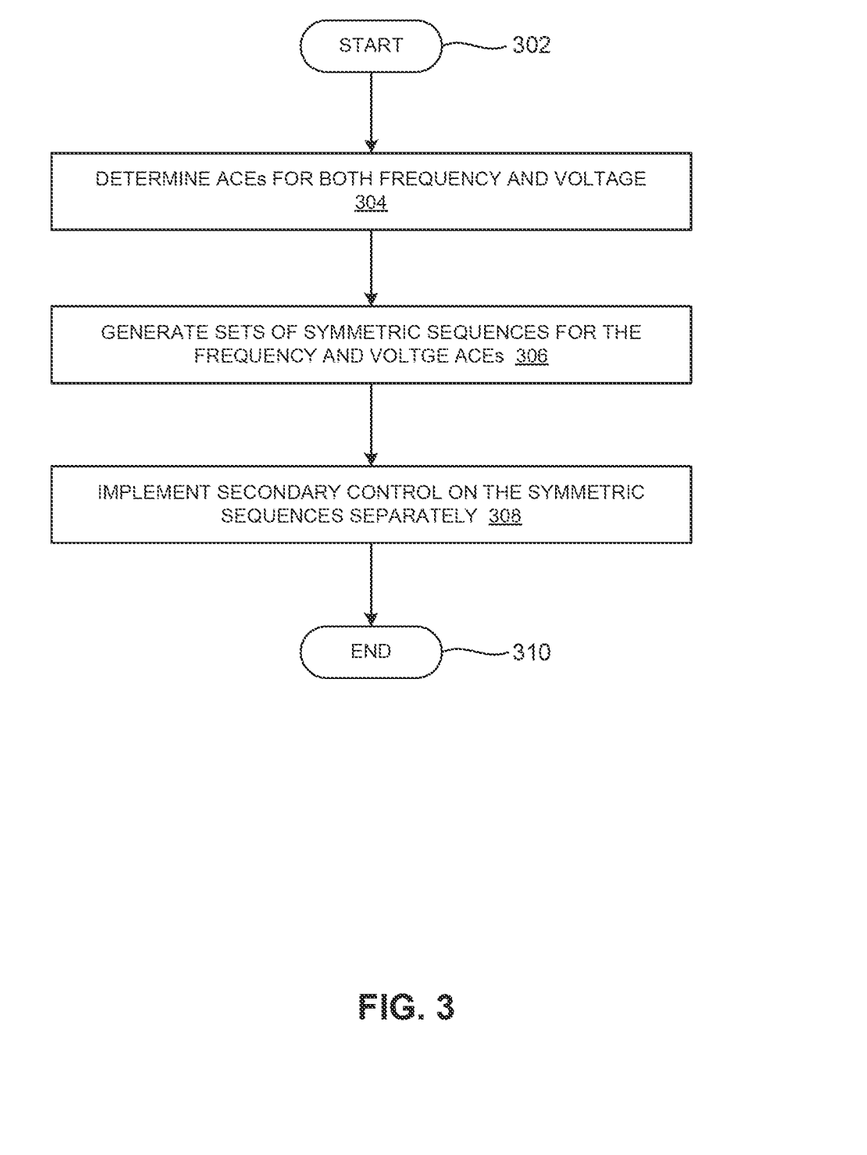
FIG. 3 is a flow diagram of a method for implementing secondary control across a power network in accordance with one or more embodiments of the present invention.

FIG. 3 is a flow diagram of a method 300 for implementing secondary control across a power network in accordance with one or more embodiments of the present invention. In various embodiments, the method 300 is an implementation of the secondary control module 216 described above. In some embodiments, a computer readable medium comprises a program that, when executed by a processor (such as a processor described above), performs the method 300.

The method 300 starts at step 302 and proceeds to step 304 where area control error (ACE) equations for both frequency and voltage are modified to account for unknown network impedance; when network impedance is unknown, it cannot be assumed that pure VARs can be used to control voltage. The ACE calculations are inverted to be in terms of V (voltage) and F (frequency) rather than W (watts) and VAR (volt ampere reactive) by modifying the original ACE equation (1) to obtain equations (2) and (3) as described above. The method proceeds to step 306.

At step 306, sequence decomposition is used to generate a set of symmetric sequences for each of the frequency and voltage ACEs. A transformation matrix is applied to the frequency and voltage ACEs to represent the unbalanced set of phasors as a balanced set of phasors. In some embodiments, a Fortescue transformation may be used, although any suitable transformation may be used. The resulting equations (4)-(7) described above are obtained for the positive and negative sequences. For three-wire delta systems, these are all that are necessary as the zero sequence is always 0. In 4-wire systems with a neutral, a 0-sequence controller could be applied to attempt to zero out the net neutral current at an intertie.

The method 300 proceeds to step 308. At step 308, secondary control is implemented on the symmetric sequences separately to provide a distributed technique for phase balancing. Positive and negative sequence secondary control commands are generated and transmitted by the area controller to the resources within its area; the resources then receive and implement the commands. In those embodiments in which the area comprises a mix of three-phase and single-phase resources (i.e., single-phase resources that connect to a single phase on a three-phase network), three-phase resources (e.g., three-phase power conditioners 110) put the received biases through a reverse transformation (e.g., a reverse Fortescue transformation) and apply different biases to each phase-leg, while the single-phase resources (e.g., single-phase power conditioners 110) do the same thing and simply use the bias term of the phase leg it to which they are attached.

The method 300 then proceeds to step 310 where it ends.

While the foregoing is directed to embodiments of the present invention, other and further embodiments of the invention may be devised without departing from the basic scope thereof, and the scope thereof is determined by the claims that follow.

The invention claimed is:

1. A method for secondary control in a power network, comprising:
   determining a frequency area controller error (ACE) equation for an area and a voltage ACE equation for the area;

decomposing the frequency ACE equation and the voltage ACE equation to generate a first set of symmetric sequences for the frequency ACE equation and a second set of symmetric sequences for the voltage ACE equation, respectively, wherein the first and second sets of symmetric sequences represent positive and negative sequences; and implementing, by an area controller for the area, secondary control on each sequence in the first and second sets of symmetric sequences separately, wherein decomposing the frequency ACE equation and the voltage ACE equation comprises applying a Fortescue transformation.

2. The method of claim 1, wherein the first and second sets of symmetric sequences are in terms of active and reactive currents.

3. The method of claim 1, wherein, for both the first and second sets of symmetric sequences, the zero sequences are equal to zero.

4. The method of claim 1, further comprising applying a zero-sequence controller to zero-out net neutral current when the area is a 4-wire system with a neutral.

5. The method of claim 1, wherein coefficients in a transformation matrix representing interactions between V (voltage), F (frequency), W (watts), and VAR (volt ampere reactive) are different between the positive sequences and the negative sequences of the first and second sets of symmetric sequences.

6. The method of claim 1, further comprising:
receiving, by a three-phase resource in the area, secondary control biases broadcasted by the area controller;
performing, by the three-phase power resource, a reverse transformation on the received secondary control biases to generate phase-leg biases; and
applying, by the three-phase power resource, a different phase-leg bias to each phase leg to which it is coupled.

7. The method of claim 6, wherein the three-phase resource is a three-phase power conditioner.

8. The method of claim 1, further comprising:
receiving, by a single-phase resource coupled to a phase leg of a three-phase system in the area, secondary control biases broadcasted by the area controller;
performing, by the single-phase resource, a reverse transformation on the received secondary control biases to generate phase-leg biases; and
applying, by the single-phase resource, a phase-leg bias, from the phase-leg biases, to the phase leg.

9. The method of claim 8, wherein the single-phase resource is a single-phase power conditioner.

10. An apparatus for secondary control in a power network, comprising:
a controller, comprising at least one processor, for (i) determining a frequency area controller error (ACE) equation for an area and a voltage ACE equation for the area; (ii) decomposing the frequency ACE equation and the voltage ACE equation to generate a first set of symmetric sequences for the frequency ACE equation and a second set of symmetric sequences for the voltage ACE equation, respectively, wherein the first and second sets of symmetric sequences represent positive and negative sequences; and (iii) implementing, by an area controller for the area, secondary control on each sequence in the first and second sets of symmetric sequences separately, wherein decomposing the frequency ACE equation and the voltage ACE equation comprises applying a Fortescue transformation.

11. The apparatus of claim 10, wherein the first and second sets of symmetric sequences are in terms of active and reactive currents.

12. The apparatus of claim 10, wherein, for both the first and second sets of symmetric sequences, the zero sequences are equal to zero.

13. The apparatus of claim 10, wherein coefficients in a transformation matrix representing interactions between V (voltage), F (frequency), W (watts), and VAR (volt ampere reactive) are different between the positive sequences and the negative sequences of the first and second sets of symmetric sequences.

14. A computer readable medium comprising a program that, when executed by a processor, performs a method for secondary control in a power network, the method comprising
determining a frequency area controller error (ACE) equation for an area and a voltage ACE equation for the area;
decomposing the frequency ACE equation and the voltage ACE equation to generate a first set of symmetric sequences for the frequency ACE equation and a second set of symmetric sequences for the voltage ACE equation, respectively, wherein the first and second sets of symmetric sequences represent positive and negative sequences; and
implementing, by an area controller for the area, secondary control on each sequence in the first and second sets of symmetric sequences separately, wherein decomposing the frequency ACE equation and the voltage ACE equation comprises applying a Fortescue transformation.

15. The computer readable medium of claim 14, wherein the first and second sets of symmetric sequences are in terms of active and reactive currents.

16. The computer readable medium of claim 14, wherein, for both the first and second sets of symmetric sequences, the zero sequences are equal to zero.

17. The computer readable medium of claim 14, wherein coefficients in a transformation matrix representing interactions between V (voltage), F (frequency), W (watts), and VAR (volt ampere reactive) are different between the positive sequences and the negative sequences of the first and second sets of symmetric sequences.

* * * * *